(12) United States Patent
Parker

(10) Patent No.: US 7,424,048 B2
(45) Date of Patent: Sep. 9, 2008

(54) GUARD INTERVAL ANALYSIS METHOD AND APPARATUS

(75) Inventor: Jonathan Parker, Bath (GB)

(73) Assignee: Conexant Systems, Inc., Newport Beach, CA (US)

( * ) Notice: Subject to any disclaimer, the term of this patent is extended or adjusted under 35 U.S.C. 154(b) by 576 days.

(21) Appl. No.: 10/340,854

(22) Filed: Jan. 10, 2003

(65) Prior Publication Data
US 2003/0219084 A1   Nov. 27, 2003

(51) Int. Cl.
H04B 1/707   (2006.01)
(52) U.S. Cl. ...................................... 375/150
(58) Field of Classification Search ............... 375/130, 375/147, 150, 316, 340, 343, 140, 152
See application file for complete search history.

(56) References Cited

U.S. PATENT DOCUMENTS 5,528,405 A * 6/1996 Belcher et al. .............. 398/208

FOREIGN PATENT DOCUMENTS

| EP | 0656706 | 11/1994 |
| EP | 0825742 | 2/1998 |
| FR | 2743967 | 1/1996 |
| FR | 0881804 | 12/1998 |
| GB | 2325825 | 12/1998 |
| GB | 2325825 A * | 12/1998 |

OTHER PUBLICATIONS

Scalise, et al., A Prototype VLSI Solution for Digital Terrestrial TV Receivers Conforming to the DVB-T Standard , SMPTE Journal, Nov. 1997.

* cited by examiner

*Primary Examiner*—Kevin M Burd
(74) *Attorney, Agent, or Firm*—Jackson Walker L.L.P.; Christopher J. Rourk

(57) ABSTRACT

A receiver circuit processes a received signal to determine information regarding a guard interval therein. The receiver circuit typically forms digital samples from the received signal; generates a correlation function with peaks at positions that are determined by the size of the guard interval and a position of the guard interval within the received signal. The receiver circuit includes one or more comb filters, each corresponding to a possible guard interval size, each receiving a series of locations at which the correlation function exceeds a predetermined threshold, and each producing an output that provides information about the guard interval size and/or position. This advantageously allows the receiver circuit to determine the guard interval size quickly, for example, even in the case of received signals with relatively low signal-noise ratio.

32 Claims, 4 Drawing Sheets

GUARD INTERVAL ANALYSIS METHOD AND APPARATUS

CROSS-REFERENCE TO RELATED APPLICATIONS

This application claims the effective filing date under 35 USC §§ 120 and 363 to PCT International Application No. PCT/EP01/07655, entitled "Receiver Circuit", filed Jul. 4, 2001 designating the U.S. and published under PCT Article 21(2) in English as International Publication No. WO 02/09383 A1 entitled "Receiver Circuit," of which this application is a continuation, which PCT application claims priority to Great Britain Patent Application No. 0017131.4, filed Jul. 12, 2000. This application claims priority under 35 USC 119(a) to Great Britain Patent Application No. 0017131.4, filed Jul. 12, 2000.

BACKGROUND OF THE INVENTION

1. Field of the Invention

This invention relates to a communication receiver, in particular for receiving signals in which a portion of a transmitted signal forms a guard interval.

2. Description of Related Art

The European DVB-T (Digital Video Broadcasting-Terrestrial) standard ETS 300 744 for digital terrestrial television (DTT) uses Coded Orthogonal Frequency Division Multiplexing (COFDM) of transmitted signals, which are therefore grouped into blocks and frames.

It is necessary to transmit the DTT signals over transmission paths which are of uncertain quality. In particular, the area close to the transmission path may include objects such as tall buildings, which cause reflections. That is, a signal may be received at a receiver twice, once on a direct path from the transmitter, and then, after a short delay, as an indirect reflected path. As is well known, this can cause inter-symbol interference (ISI) in the receiver. To reduce this problem, DVB-T COFDM signals include a cyclic prefix guard interval to each active symbol. Specifically, the end portion of the active symbol is repeated before the current active symbol.

These cyclic signals must be correctly removed before demodulation, or the demodulation performance can be seriously degraded. Before the cyclic signals can be removed, it is necessary to know the duration of the guard interval. This is not a constant value, because the presence of the guard interval reduces the efficiency with which the transmission channel can be used, and so it is advantageous to vary the size of the guard interval to be the minimum allowed by the conditions.

The receiver must therefore include a mechanism for determining the size of the guard interval. The chosen mechanism must be robust enough to deal with noisy signals, and with signals which suffer from multipath and co-channel interference.

SUMMARY OF THE INVENTION

It is an object of the invention to provide a receiver circuit which overcomes some of the disadvantages of the prior art.

For example, it may be advantageous for the receiver circuit to be able to determine the guard interval size quickly, even in the case of received signals with relatively low signal-noise ratio.

In a first aspect, the invention relates to a receiver circuit for analyzing a received signal in regard to a guard interval therein, comprising: a sampler for forming digital samples of the received signal; a correlator for generating from the digital samples a correlation function with peaks at positions which are determined by the size of the guard interval and a position of the guard interval within the received signal; and one or more comb filters, each corresponding to a possible guard interval size, each receiving a series of sample locations at which the correlation function exceeds a predetermined threshold to the series of sample locations.

Further, the invention relates in a second aspect to a method of determining a guard interval size of a received signal, the method comprising: forming digital samples of the received signal; generating from the digital samples a correlation function with peaks at positions that are determined by the size of the guard interval and a position of the guard interval within the received signal; determining a series of sample locations at which the correlation function exceeds a predetermined threshold; applying a plurality of comb filters, each corresponding to a possible guard interval size, to the series of sample locations; and determining the guard interval size from outputs of said comb filters.

In a third aspect, the invention relates to a method of processing a received signal having guard intervals. The method includes as step of correlating the received signal with a delayed version of itself and selecting peaks at which a function developed from the self-correlation exceeds a predetermined threshold to identify peaks of interest. The method further includes a step of applying a comb filter corresponding to a guard interval size to a selected peak series, developed from the peaks of interest, in order to discriminate peaks that are expected to provide useful information about the guard interval.

DETAILED DESCRIPTION

Figure 1:
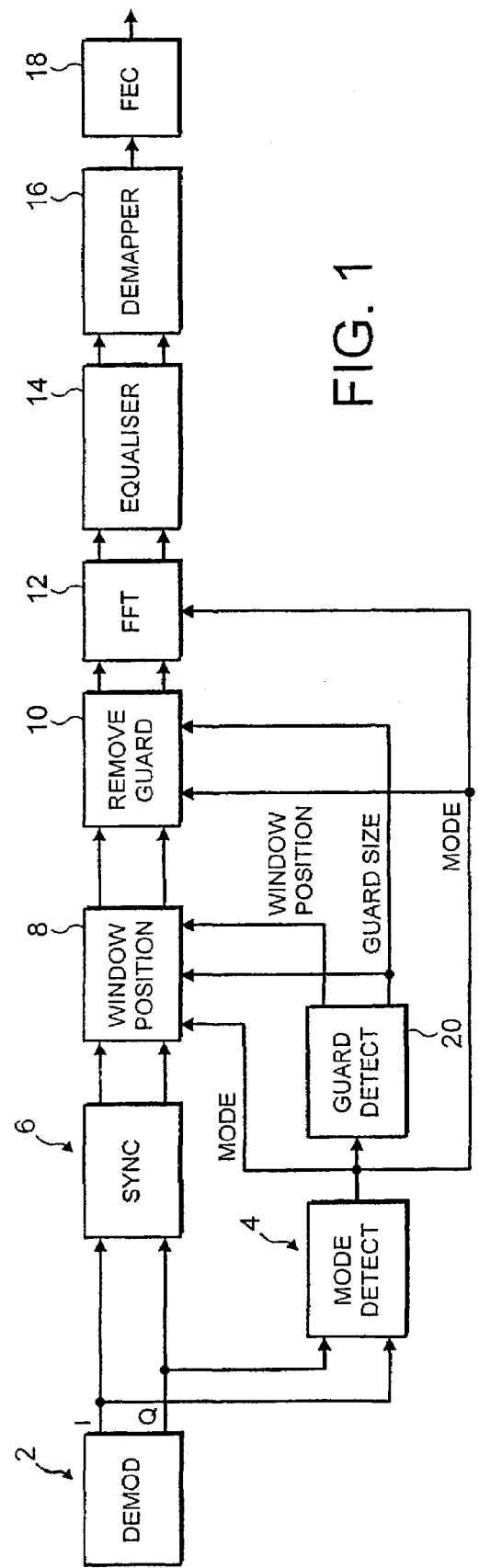
FIG. 1 is a simplified block schematic diagram of a receiver circuit according to the invention.

FIG. 1 is a simplified block diagram of a receiver circuit made in accordance with the present invention. Typically, in the exemplary case of a digital terrestrial television signal receiver, for example receiving signals using the DVB-T standard with Coded Orthogonal Frequency Division Multiplexing, the receiver includes an antenna (not shown) and a tuner (not shown) for receiving the signals. As shown in FIG. 1, received signals are supplied to a demodulator 2, which mixes the received RF input signal down to baseband in-phase (I) and quadrature (Q) components and produces digital samples. The baseband I and Q components are supplied to a mode detection block 4, which determines whether the received signal was transmitted in 2 k or 8 k mode, and provides a mode detection output. The baseband I and Q components are also supplied to a synchronizer block 6, which removes frequency and sampling rate offsets, and then to a window position block 8. Following determination of the window position, the received signals are applied to a guard removal block 10, FFT block 12, equalizer 14, demapper 16, and FEC block 18. The resulting MPEG data is output to a demultiplexing device (not shown) for ultimate display.

The receiver also includes a guard detection block 20, which determines the size and position of the guard interval, for supply to the window position block 8 and guard removal block 10, allowing them to operate accurately.

The guard detection block 20 is illustrated schematically in FIG. 2, and a method for determining the guard interval size will be described with reference to FIG. 2, and to FIG. 3, which shows a flow chart illustrating the inventive method.

Figure 2:
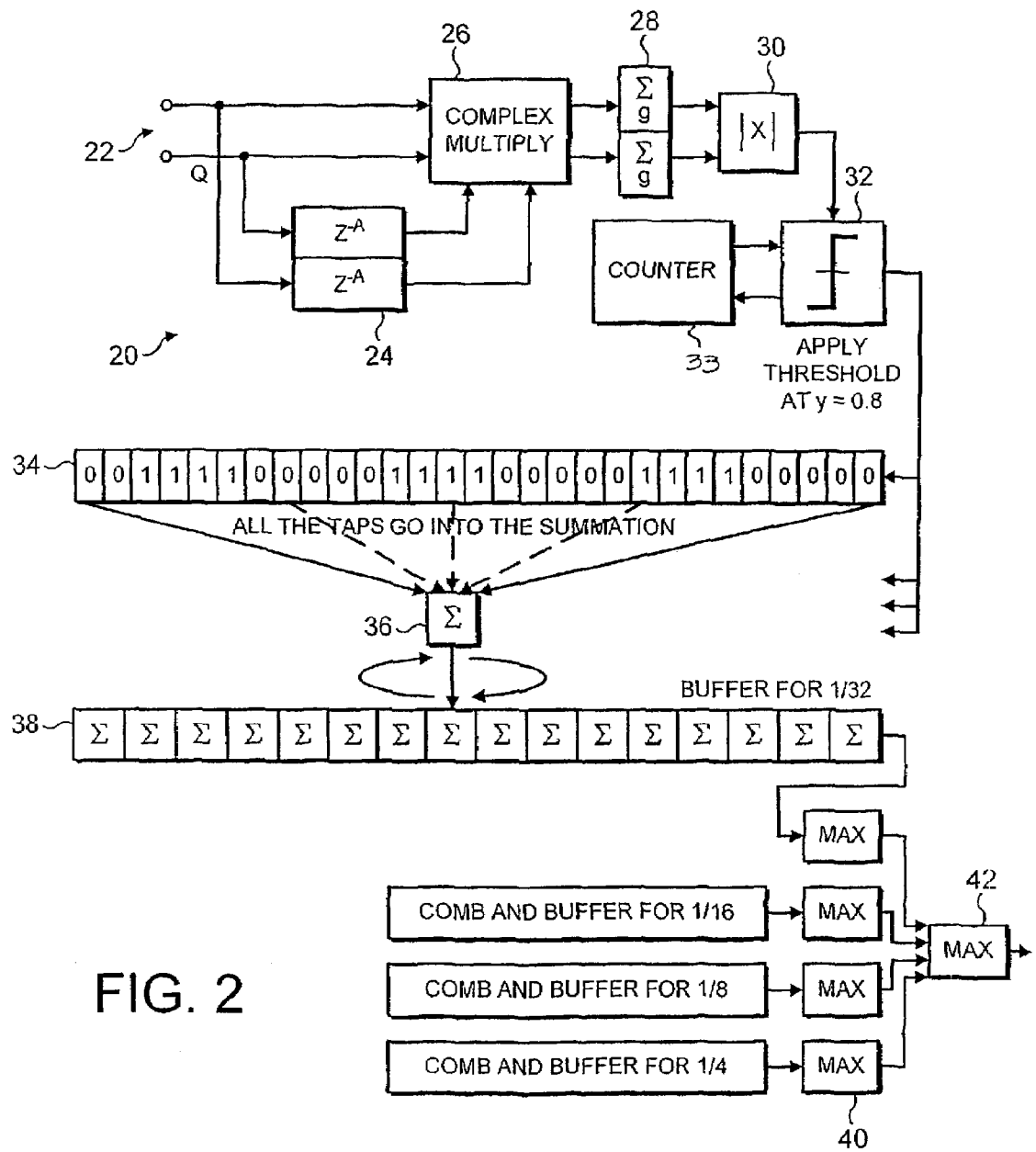
FIG. 2 is a block schematic diagram of a guard detection block component used in the receiver circuit of FIG. 1.
Figure 3:
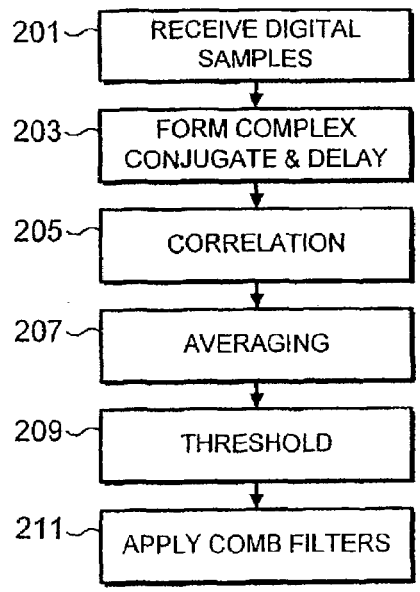
FIG. 3 is a flow chart of a method according to one aspect of the invention.

The method of FIG. 3 includes a first step, step 201, of receiving the digital samples at respective I and Q inputs 22 (FIG. 2). For each sample, the complex conjugate of the sample is formed, and the sample is applied to a delay block 24 (FIG. 2), in step 203 (FIG. 3). The delay block 24 is a FIFO buffer of A taps, and thus applies a delay equivalent to the duration of A samples, where A is the FFT size (that is, for example, 2048 in 2 k mode or 8192 in 8 k mode), and is the duration of the active part of the symbol, expressed in samples.

Then, in step 205 of the method, a correlation function is calculated in a complex multiplication block 26 (FIG. 2), by multiplying each input symbol with the appropriate symbol obtained in step 203 with the delay applied thereto, thereby obtaining a measure of the correlation between them. The results are then supplied to a summing block 28 (in FIG. 2), in which, in step 207 (FIG. 3), a running average is calculated over a number of samples g, which equals the smallest allowed guard interval size, that is, $\frac{1}{32}$ of the active symbol or $\frac{1}{32}$ of the FFT size. Thus, g=64 samples in 2 k mode and 256 samples in 8 k mode. The output average value is then obtained by applying the result from block 28 to a block 30, which takes the modulus of the output complex numbers.

The calculated correlation function is a measure of the degree to which each sample is correlated with the sample appearing in the input signal after a particular delay. The function is averaged over time to provide a measure of the correlation between a particular sequence of samples and the sequence of samples appearing after that delay. Because it is known that the guard interval contains samples which are repeats of samples from the active symbol appearing later in the signal, a high value of the correlation function may be an indication that it is the samples of the guard interval that are being examined.

Figure 4:
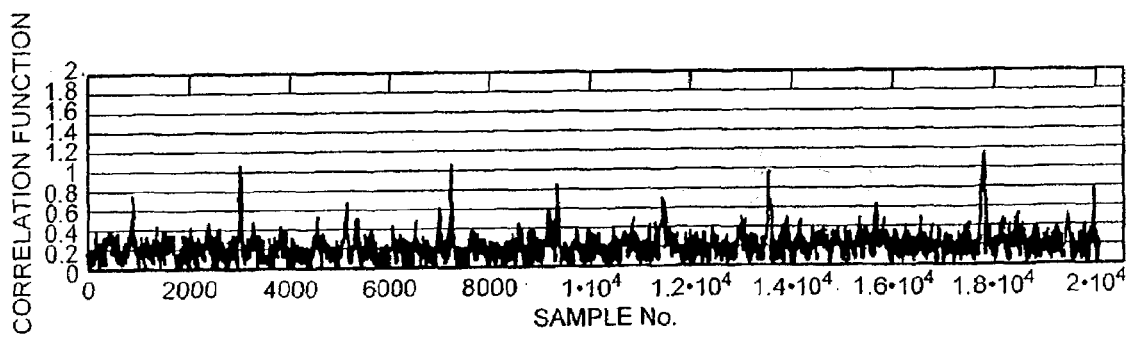
FIG. 4 is an explanatory diagram of the value of an averaged correlation function produced by a component of the guard detection block of FIG. 2.

FIG. 4 is an explanatory graph of the value of this averaged correlation function, obtained from block 30, showing how it varies over a large number of samples, for one particular set of trial data.

It can be seen that the correlation function has a value that varies in an unpredictable way, because of chance correlations between the samples at different times, but that includes a number of peaks. These peaks can again arise because of chance correlations, or may arise because it is the samples of the guard interval that are under examination.

In step 209 of the method shown in FIG. 3, the value of the correlation function is then compared with a threshold value in a thresholding block 32 of FIG. 2, and it is only positions at which the value of the correlation function exceeds the threshold value which are investigated further, in order to determine whether the large value of the correlation function is due to chance or indicates the position of the guard interval. A counter 33 is connected to the thresholding block 32, and used to create a dead period immediately after the threshold is crossed, during which the output is zero. The length of the dead period may for example be half of one symbol period.

The use of the threshold value and dead period provide robustness. The presence of multipath and/or co-channel interference can distort the shape of the peak in the correlation function. However, it will not remove the rising edge of the peak. Thus, the use of the threshold value means that the method relies not on the shape of the peak (which is subject to this distortion), but on the periodicity of the peaks (which is not significantly affected by the interference). Further, the use of the dead period (provided this is not too short) ensures that multiple successive spurious peaks are not recorded.

The selection of the threshold value is clearly important. If the value is too high, some of the points of potential interest will be missed, while, if it is too low, too many points will be examined, possibly leading to an inaccurate estimate of the guard interval size. It may be possible to set the threshold in initial settings of the receiver circuit. Alternatively, a further algorithm can adjust the threshold value, by starting with a high value, and reducing it until a stable value of the guard interval size is obtained. A further alternative is to measure the range of the correlation signals and to set the threshold at a fraction of the maximum. For example, values in the range of 0.6 to 0.8 of the maximum have been found to work. It is assumed hereafter that a suitable threshold has been adopted.

Figure 5:
FIG. 5 is a further explanatory diagram describing aspects of the steps used in the method of FIG. 3.

With a suitable threshold selected, FIG. 5 shows the points at which the value of the correlation function exceeds the threshold value. Based on the particular correlation function illustrated in FIG. 4, the points shown in FIG. 5 are obtained by using a threshold value of 0.8.

This procedure is then repeated until either a predetermined number of samples have been examined, or a predetermined number of points have been obtained.

The procedure described above is one method of obtaining a function that has peaks corresponding to the guard interval location. Similar functions could be obtained in other ways, for example by performing a subtraction rather than a complex correlation in step 205 of the inventive method.

The spacing of the spikes in the graph of FIG. 5 indicate which guard interval is present. However, it is difficult to measure this directly for two reasons. Firstly, some spikes are missing, where the peaks did not reach the threshold set in the thresholding block 32 (FIG. 3). Secondly, the exact location of the spikes is noisy, due to channel noise and self-noise, which mean that the positions of peaks in the correlation are subject to noise. Thirdly, some peaks will be due to noise only, particularly where the threshold has been set too low, or where the noise power is high.

In order to resolve these problems, the function illustrated in FIG. 5 is filtered further.

Specifically, as shown at step 211 in FIG. 3, each of a number of comb filters 34 is applied to the detected series of points at which the threshold is exceeded. This is shown schematically in FIG. 2.

Each comb filter 34 has a pattern of zeroes and ones, the ones forming the teeth of the comb. The teeth of the comb have a finite width, which deals with the lateral positional noise in the spacing of the spikes. Moreover, the fact that some spikes will be missing from the series, as discussed above, is accommodated by providing a large number of teeth. For ease of illustration, FIG. 2 shows a comb filter in which the teeth have a width of four samples and a spacing of nine samples. In one practical example, the teeth of the comb filter have a width of 32 samples and a spacing which is equal to the total symbol size, that is, the sum of the active symbol size and the guard interval size. In other words, the spacing of the teeth in the comb filter is equal to the repetition spacing of the guard interval. In 2 k mode, testing for a guard interval size of 1/32 of the active symbol size, the spacing is 2048+ 64=2112 samples.

There is one comb filter 34 for each possible guard interval size. Thus, if there are four possible sizes of the guard interval, there are four comb filters.

The outputs from each comb filter 34 are summed in a block 36, and added into an accumulator forming part of a circular buffer 38. The pointer then moves on to the next accumulator. At the end of the buffer, it jumps back to the start. Just as there is one comb filter 34 for each possible guard interval size, similarly, there is one buffer connected to each comb filter, and hence one buffer for each possible guard interval size. It should be noted that, because the different possible guard sizes are tested for in parallel, the time taken to complete the process is largely independent of the number of possible sizes.

Thus, in one embodiment, the described technique uses large amounts of memory within the receiver. However, it is only necessary to perform the required guard interval size detection once, during an acquisition phase, at a time when there is a large amount of RAM in the receiver which is not being used for other purposes.

The length of each buffer is equal to the symbol length expressed in samples, and thus corresponds to the spacing of the teeth in the corresponding comb filter. Therefore, in 2 k mode, testing for a guard interval size of 1/32 of the active symbol size, the buffer consists of 2048+64=2112 accumulators.

In other words, a correlation value is calculated between a first function which comprises a series of regularly spaced delta functions (the comb filter), and a second function which comprises a delta function at each of the positions at which the correlation exceeds the threshold.

At one position of the comb filter relative to the function shown in FIG. 5, the spikes line up with the teeth, and give a high output. When the spikes and the filter teeth do not line up, the output is low, because the spikes align mainly with zeroes in the comb filter. The results must be averaged over many symbols because, if the transmitted signal had a guard size equal to 1/4 of the active symbol size, part of the symbol would align with the comb filter teeth even for the comb which is detecting the 1/32 guard size. This partial overlap is removed by the averaging process, because the alignment would occur at different points in the buffer. The averaging process also deals with the problem of missing spikes, or spikes occurring due to noise only.

Outputs from the buffers 38 are supplied to MAX blocks 40, which find the positions, and heights, of the biggest accumulator outputs.

FIG. 6 shows the result of this process for the data used in FIGS. 3 through 5. Specifically, FIG. 6(a) shows the output of the comb filter corresponding to a guard interval size of 1/4 FFT size (512 samples); FIG. 6(b) shows the output of the comb filter corresponding to a guard interval size of 1/8 FFT size (256 samples); FIG. 6(c) shows the output of the comb filter corresponding to a guard interval size of 1/16 FFT size (128 samples); and FIG. 6(d) shows the output of the comb filter corresponding to a guard interval size of 1/32 FFT size (64 samples).

Outputs from the MAX blocks 40 are supplied to a further MAX block 42, which outputs the index of whichever input was the largest.

Figure 6A:
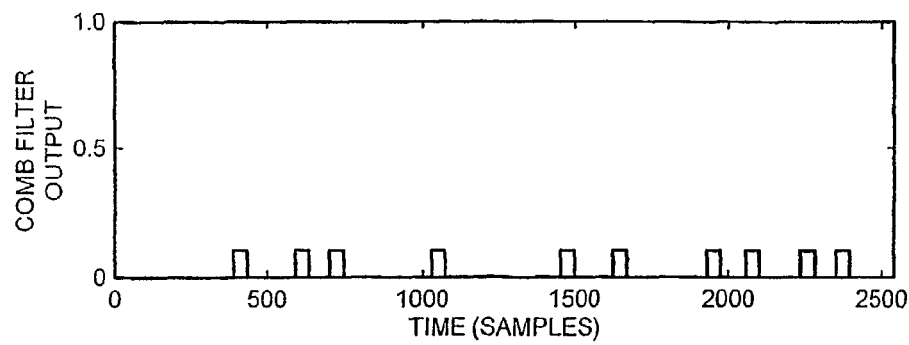
FIG. 6, comprising FIGS. 6(*a*)-6(*d*), is a further explanatory diagram showing the results obtained using the method of FIG. 3 and the data of FIGS. 4 and 5.
Figure 6B:
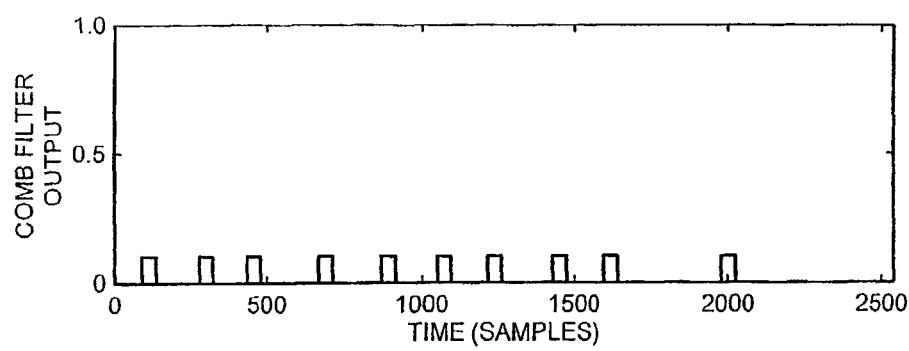
Figure 6C:
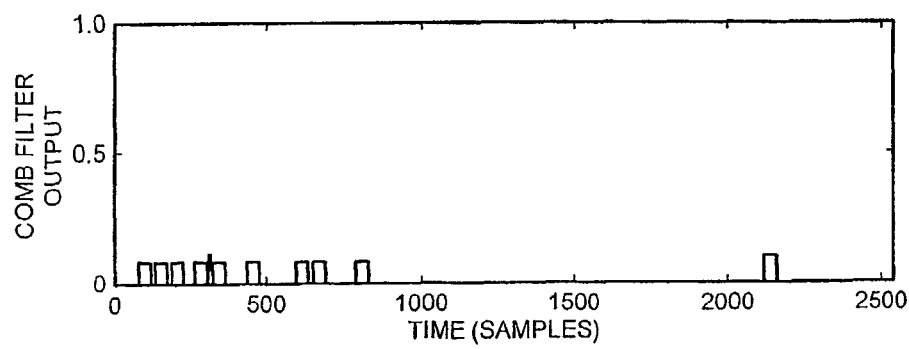
Figure 6D:
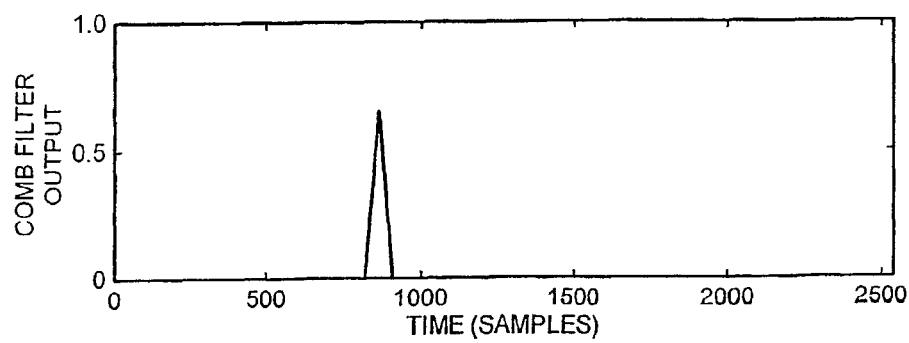

From FIG. 6, it can be seen that there is a clear peak in the output of the comb filter which corresponds to a guard interval size of 64 samples (FIG. 6d). As a result, this is determined to be the actual guard interval size.

The fact that the signals are analyzed by the four (in this example) comb filters and buffers in parallel means that the start up time, required to find the guard interval size, can be reduced.

Moreover, the position of the peak can be used to determine the position of the start of each symbol. Specifically, the position of the peak within the circular buffer indicates the position along the input stream of samples at which the averaging window aligns directly with the cyclic prefix. This allows the position of the start of the active part of the symbol to be calculated, at least approximately, very quickly. This means that the acquisition phase of operation of the receiver can be completed quickly.

There is therefore described a method of analyzing the guard interval which allows the size to be detected quickly, even in the presence of relatively large noise signals. The method is robust in noise, and also robust enough to handle signals with severe multipath and/or co-channel interference. Moreover, the method is of low complexity, and can be implemented in a VLSI circuit.

What is claimed is:

1. A method of processing a received signal, determining a size of a guard interval therein, the method comprising:
   a) forming digital samples of the received signal;
   b) generating from the digital samples a correlation function with peaks at positions that are determined by the size of the guard interval and a position of the guard interval within the received signal;
   c) determining a series of sample locations at which the correlation function exceeds a predetermined threshold and applying a dead period such that multiple successive sample locations that follow the predetermined threshold cannot be recorded;
   d) applying at least one comb filter, corresponding to a guard interval size, to the series of sample locations; and
   e) deducing information about the guard interval from outputs of the comb filter.

2. The method of claim 1, wherein step (d) includes applying a plurality of different comb filters, each corresponding to a possible guard interval, to the series of sample locations.

3. The method of claim 2, wherein step (e) includes deducing a size of the guard interval by comparing outputs of the plurality of comb filters.

4. The method of claim 3, wherein step (b) comprises generating the correlation function by:
   i. applying a predetermined delay to the digital samples; and
   ii. calculating the correlation function from a correlation between a sequence of digital samples and a sequence of digital samples having a delay applied thereto.

5. The method of claim 4, further comprising the step (f) of summing outputs from each of the comb filters.

6. The method of claim 2, wherein each comb filter has a plurality of teeth spaced to match a size of a guarded symbol that includes an active symbol combined with a corresponding possible guard interval size.

7. The method of claim 2, wherein the step (e) comprises determining a guard interval size by determining which of said comb filters produces an output that indicates that peaks in said correlation function occur at positions which are spaced by a separation corresponding to a size of a symbol formed by an active symbol and the corresponding possible guard interval size.

8. A receiver circuit for processing a received signal having a guard interval therein, comprising:
   a) a sampler forming digital samples of the received signal;

b) a correlator generating a correlation function from the digital samples, the correlation function providing a basis for peaks at positions that are determined by the size of the guard interval end a position of the guard interval within the received signal and a correlation peak detector configured to select the series of sample locations from peaks of the correlator output that are detected to exceed a predetermined threshold, the correlation peak detector including a suppression counter for suppressing peaks that follow within a selected period of a detected peak; and c) a comb filter corresponding to a guard interval size, receiving a series of sample locations at which the peaks are based upon the correlation function exceeding a predetermined threshold.

9. The receiver of claim 8, further comprising a plurality of comb filters, each corresponding to a different possible guard interval size and receiving the series of sample locations and having a resulting output.

10. The receiver of claim 9, further comprising: d) a comb filter output comparison circuit comparing outputs corresponding to the different possible guard interval sizes and determining an actual guard interval size of the received signal based upon such comparison.

11. The receiver of claim 10, further comprising: e) a plurality of buffers of accumulators, each corresponding to a respective one of the plurality of comb filters, summing the outputs therefrom to establish the outputs corresponding to the different possible guard interval sizes.

12. The receiver of claim 8, wherein the correlator further comprises:
   i) a delay circuit providing samples of the received signal that are delayed by a delay duration selected to equal an expected time between an end of a first guard interval and a beginning of an immediately subsequent guard interval; and
   ii) a complex multiplier multiplying the digital samples of the received signal by the delayed samples of the received signal.

13. The receiver of claim 8, further comprising: d) a correlator output adder adding a selected number of correlator outputs to form an averaged correlator output value.

14. The receiver of claim 13, wherein the correlator output adder adds the selected number of sequential correlator outputs to form running average values of the correlator output.

15. The receiver of claim 14, wherein the selected number of sequential correlator outputs is equal to the number of samples in the smallest expected guard interval size.

16. The receiver of claim 8, wherein the suppression counter is configured to suppress subsequent peaks tat follow a first peak by a duration of less than about one-half of a multi-carrier symbol duration.

17. The receiver of claim 8, further comprising:
   e) a plurality of comb filters, each corresponding to a different possible guard interval size and receiving the series of sample locations and having a resulting output;
   f) a correlator output adder adding a selected number of sequential correlator outputs to form running average correlator output values; and
   g) a comb filter output comparison circuit comparing outputs corresponding to the different possible guard interval sizes and determining an actual guard interval size of the received signal based upon such comparison.

18. A method of processing a received signal having guard intervals dispersed therein, comprising:

a) correlating the received signal with a delayed version of the received signal to create a received signal delay correlation;

b) selecting peaks at which a correlation function developed from the received signal delay correlation exceeds a predetermined threshold to identify peaks of interest while suppressing peaks of interest that follow within a selected dead period following a first peak of Interest to form the selected peak series; and c) applying a comb filter corresponding to a guard interval size to a selected peak series developed from the peaks of interest to form a comb filtered selected peak series for deducing information about the guard interval.

19. The method of claim 18, wherein the step c) further comprises applying a plurality of different comb filters, each corresponding to a different possible guard interval size, to the selected peak series, and further comprising a step d) comparing outputs from the plurality of comb filters to determine which of the possible guard interval sizes is utilized in the received signal.

20. The method of claim 19, wherein the step d) further comprises summing outputs from each comb filter in a corresponding accumulator buffer and comparing the resulting accumulator buffers to determine which of the possible guard interval sizes is utilized in the received signal.

21. The method of claim 19, further comprising:
   e) sampling a source signal such that the received signal is represented as a sequence of digital samples;
   f) developing running averages of a selected number of received signal delay correlation values; and
   g) developing the correlation function from magnitudes of the running averages.

22. The method of claim 21, wherein a number of samples in the shortest expected guard interval is the selected number of received signal delay correlation values for the running averages.

23. The method of claim 18, wherein the delayed version of the received signal is delayed by a time equal to an expected time between an end of a first guard interval and a beginning of a next succeeding guard interval.

24. The method of claim 18, further comprising:
   d) filtering the correlation of the received signal delay correlation to form a filtered received signal delay correlation; and
   e) developing the correlation function from magnitudes of the filtered received signal delay correlation.

25. The method of claim 24, further comprising f) sampling a source signal such that the received signal is represented as a sequence of digital samples; and wherein the filtering step d) further comprises avenging the received signal over a selected number of samples to form a running avenge of samples.

26. The method of claim 25, wherein the selected number of samples averaged for the running average is the number of samples in the smallest expected guard interval.

27. The method of claim 18, further comprising d) suppressing peaks of interest that follow within a selected dead period following a first peak of interest to form the selected peak series.

28. The method of claim 27, wherein the dead period is selected to be about one half of the time between successive guard intervals.

29. The method of claim 18, wherein selecting peaks in the selecting peaks step b) is performed without assuming a length of the guard intervals in the received signal.

30. A receiver for processing a received signal having guard intervals therein, comprising:
   a) means for forming digital samples of the received signal;

b) means for generating a correlation function from the digital samples;
c) means for selecting a series of peaks, based upon comparison of the output of the correlation function with a predetermined threshold while suppressing peaks that follow within a selected dead period following a first selected peak in the series of peak; and
d) means for filtering the selected series of peaks to identify peaks that are consistent with a guard interval size.

31. The receiver of claim 30, wherein the means for filtering (d) comprises means for altering the selected series of peaks concurrently to identify peaks that are consistent with a plurality of different guard interval sizes.

32. The receiver of claim 31, further comprising: e) means for determining which of the plurality of different guard interval sizes the selected series of peaks is most consistent with.

* * * * *